(12) United States Patent
Uneura et al.

(10) Patent No.: US 10,513,974 B2
(45) Date of Patent: Dec. 24, 2019

(54) TURBOCHARGER

(71) Applicant: IHI Corporation, Koto-ku (JP)

(72) Inventors: Yutaka Uneura, Tokyo (JP); Jaemin Huh, Tokyo (JP)

(73) Assignee: IHI Corporation, Koto-ku (JP)

( * ) Notice: Subject to any disclaimer, the term of this patent is extended or adjusted under 35 U.S.C. 154(b) by 192 days.

(21) Appl. No.: 15/425,047

(22) Filed: Feb. 6, 2017

(65) Prior Publication Data

US 2017/0145908 A1    May 25, 2017

Related U.S. Application Data

(63) Continuation of application No. PCT/JP2015/072779, filed on Aug. 11, 2015.

(30) Foreign Application Priority Data

Aug. 29, 2014   (JP) ................... 2014-176207

(51) Int. Cl.
*F02B 37/18*    (2006.01)

(52) U.S. Cl.
CPC .................... *F02B 37/18* (2013.01)

(58) Field of Classification Search
CPC ...... F02B 37/186; F02B 37/18; F02B 37/183; F01D 17/105; F05D 2260/96; F05D 2220/40; F05D 2250/312; F05D 2250/73; F05D 2260/606; Y02T 10/144
USPC ......................................................... 60/602
See application file for complete search history.

(56) References Cited

U.S. PATENT DOCUMENTS

| 2009/0028694 A1 | 1/2009 | Naemura et al. |
| 2011/0005222 A1 | 1/2011 | Hayashi et al. |
| 2011/0126537 A1 | 6/2011 | Yoshimoto et al. |

(Continued)

FOREIGN PATENT DOCUMENTS

| CN | 102472160 A | 5/2012 |
| CN | 103649490 A | 3/2014 |

(Continued)

OTHER PUBLICATIONS

International Search Report dated Oct. 27, 2015 in PCT/JP2015/072779, filed on Aug. 11, 2015 ( with English Translation).

(Continued)

*Primary Examiner* — Thai Ba Trieu
(74) *Attorney, Agent, or Firm* — Oblon, McClelland, Maier & Neustadt, L.L.P.

(57) ABSTRACT

A valve is provided fitted into a mounting hole of a mounting member. The valve is allowed to have play with respect to the mounting member. The valve includes a valve body having a valve surface capable of being brought into contact with and being separated from a valve seat. A valve shaft is integrally formed on a head of the valve body. An axial center of the bypass passage is inclined with respect to a thickness direction of an inner wall portion of a turbine housing so that an opening portion on an outlet side in the bypass passage is located closer to a stem side than an opening portion on an inlet side. A center of the valve surface of the valve body is eccentric to the stem side with respect to an axial center of the valve shaft.

13 Claims, 6 Drawing Sheets

(56) References Cited

U.S. PATENT DOCUMENTS

| | | | |
|---|---|---|---|
| 2011/0173974 A1* | 7/2011 | Grabowska | F02B 37/183 60/602 |
| 2012/0292547 A1 | 11/2012 | Kierat et al. | |
| 2012/0312010 A1* | 12/2012 | Yasoshima | F02B 37/186 60/602 |
| 2013/0199175 A1 | 8/2013 | Hoshi et al. | |
| 2014/0130496 A1 | 5/2014 | Honma et al. | |
| 2015/0016963 A1* | 1/2015 | McEwen | F02B 37/186 415/145 |
| 2015/0097345 A1* | 4/2015 | House | F02B 37/186 277/585 |
| 2015/0104300 A1* | 4/2015 | Yanagida | F02B 37/22 415/204 |
| 2017/0145909 A1* | 5/2017 | Huh | F02B 37/18 |
| 2017/0145911 A1* | 5/2017 | Takahashi | F02B 37/186 |
| 2018/0230848 A1* | 8/2018 | Iwata | F01D 17/105 |

FOREIGN PATENT DOCUMENTS

| | | | |
|---|---|---|---|
| CN | 204591467 U | * | 8/2015 |
| JP | 59-111926 U | | 7/1984 |
| JP | 61-33923 U | | 3/1986 |
| JP | 2001-263078 | | 9/2001 |
| JP | 2008-101589 | | 5/2008 |
| JP | 2009-203835 | | 9/2009 |
| JP | 2009-236088 | | 10/2009 |
| JP | 2010-209688 | | 9/2010 |
| JP | 2011-106358 | | 6/2011 |
| JP | 2011-144762 A | | 7/2011 |
| JP | 2012-167610 | | 9/2012 |
| JP | 2013-24043 | | 2/2013 |
| JP | 2013-24139 A | | 2/2013 |
| JP | 2013-519813 | | 5/2013 |
| WO | WO 03/033950 A1 | | 4/2003 |

OTHER PUBLICATIONS

Written Opinion dated Oct. 27, 2015 in PCT/JP2015/072779, filed on Aug. 11, 2015.

Office Action dated Nov. 28, 2017 in Japanese Patent Application No. 2016-545428 (with English language translation), 5 pages.

Combined Chinese Office Action and Search Report dated Jun. 28, 2018 in Chinese Patent Application No. 201580044371.2 (with English translation of Category of Cited Documents), 7 pages.

* cited by examiner

TURBOCHARGER

CROSS REFERENCE TO RELATED APPLICATIONS

This application is a continuation application of International Application No. PCT/JP2015/072779, filed on Aug. 11, 2015, which claims priority to Japanese Patent Application No. 2014-176207, filed on Aug. 29, 2014, the entire contents of which are incorporated by reference herein.

BACKGROUND

1. Technical Field

The present disclosure relates to a turbocharger such as a turbocharger for a vehicle which turbocharges air to be supplied to an engine by utilizing energy of an exhaust gas from the engine.

2. Description of the Related Art

As a measure for suppressing an excessive rise of a turbocharging pressure by a turbocharger for a vehicle, a bypass passage is usually formed in an inner wall portion of a turbine housing in the turbocharger for a vehicle. A part of an exhaust gas flows through this bypass passage and bypasses the turbine wheel. Furthermore, a waste gate valve that opens and closes an opening portion on an outlet side of the bypass passage is provided at an appropriate position of the turbine housing. Here, the bypass passage is one of a variable gas flow passage for adjusting a flow rate of the exhaust gas supplied to the turbine wheel side, and the waste gate valve is one of a variable flow valve (a variable flow valve mechanism) that opens and closes an opening portion on an outlet side in the variable gas flow passage.

The waste gate valve includes a stem (rotating shaft) rotatably supported by the turbine housing, a valve capable of abutting on and being separated from a valve seat on the opening portion side in the bypass passage, and a mounting member for connecting the stem with the valve. The stem is supported in a support hole penetrated and formed in an outer wall portion of the turbine housing so that the stem (rotating shaft) is rotatable in a forward and reverse direction. A base end portion (one end portion) of the stem protrudes outside from the outer wall portion of the turbine housing. Furthermore, a base end portion (one end portion) of a link member is integrally connected to the base end portion of the stem. The link member swings in the forward direction or in the reverse direction around an axial center of the stem by driving an actuator.

A base end portion of the mounting member is integrally connected to a distal end portion (the other end portion) of the stem. A mounting hole is penetrated and formed in a distal end portion of the mounting member. A valve is fitted into the mounting hole of the mounting member. In this fitting, the valve is allowed to have play (including tilting and slight movement) with respect to the mounting member. Furthermore, the valve includes a valve body, and a valve shaft provided integrally with a head (portion on a side opposite to a valve surface) of the valve body. The valve body has the valve surface capable of being brought into contact with and being separated from the valve seat on a peripheral edge of the opening portion on the outlet side in the bypass passage. The valve shaft is connected, as a valve connecting member, to the mounting member by being fitted into the mounting hole of the mounting member. Moreover, a retaining member is provided integrally at a distal end portion of the valve shaft. The retaining member is for preventing removal of the valve with respect to the mounting member.

When the turbocharging pressure reaches a set pressure, the drive of the actuator swings the link member in the forward direction. The swing of the link member in the forward direction causes the valve to swing in the forward direction (opening direction) via the stem and the mounting member to thereby open the opening portion of the bypass passage. In addition, when the turbocharging pressure becomes less than the set pressure after the opening portion of the bypass passage is opened, the drive of the actuator swings the link member in the reverse direction. The swing of the link member in the reverse direction causes the valve to swing in the reverse direction (closing direction) via the stem and the like to thereby close the opening portion of the bypass passage. Since the play (rattling) of the valve with respect to the mounting member is allowed, follow-up property (close contact) of the valve body to the valve seat on the valve surface is enhanced when the opening portion of the bypass passage is closed, and stability (reliability) of an operation of the waste gate valve is ensured.

Note that a technology relating to the present disclosure is illustrated in Japanese Patent Application Laid-Open Publication Nos. 2009-236088 and 2008-101589.

SUMMARY

Incidentally, in order to ensure stability of the operation of the waste gate valve as described above, the play of the valve with respect to the mounting member is preferably required to be allowed. On the other hand, if the play of the valve with respect to the mounting member is allowed, during an operation of the turbocharger for a vehicle, for example, when the opening portion on the outlet side of the bypass passage begins to be opened or immediately before the opening portion is closed, vibration contact (contact caused by vibration) is sometimes generated between the valve and the valve seat by pulsation of the exhaust gas (exhaust pulsation) from an engine side, the pulsation from an actuator side in the vicinity of the stem, or the like. In such a case, a chattering sound (contact sound caused by the vibration) is generated from the waste gate valve, and it is concerned that quietness of the waste gate valve is lowered.

Note that the aforementioned problem is also similarly generated in a case where the turbocharger such as a turbocharger for a vehicle is equipped with a variable flow valve other than the waste gate valve.

Accordingly, the present disclosure has an object to provide a turbocharger which can solve the aforementioned problems.

An aspect of the present disclosure is a turbocharger including a variable flow valve configured to open and close an opening portion on an outlet side of a gas variable flow passage for adjusting a flow rate of an exhaust gas to be supplied to a turbine wheel side, the opening portion being formed on an inner wall portion of a turbine housing or on an inner wall portion of a connecting body connected and communicated with the turbine housing, wherein the variable flow valve includes: a stem supported by the turbine housing or an outer wall portion of the connecting body; a mounting member integrally connected to the stem; and a valve provided on the mounting body and including a valve body having a valve surface for opening and closing an opening portion of the gas variable flow passage and a valve connecting member provided on the valve body and connected to the mounting member; and wherein a center of the valve surface of the valve body when the opening portion of the gas variable flow passage is closed is eccentric to a side opposite to the stem side with respect to an axial center of the gas variable flow passage.

Here, in the description and claims of the present application, a "turbocharger" has a meaning including not only of a turbocharger with a single stage but also a turbocharger with a multiple stages (low-pressure stage and high-pressure stage). A "connecting body connected in a state of communicating with the turbine housing," has a meaning including a pipeline, a manifold, a casing and the like which are connected in a state of communicating with a gas inlet or a gas outlet of the turbine housing. In addition, a "variable gas flow passage" has a meaning including a bypass passage and the like for causing a part of the exhaust gas to bypass the turbine wheel, and a "variable flow valve" has a meaning including the waste gate valve or the like which opens and closes an opening portion of the bypass passage. Additionally, the term "provided" has a meaning including being indirectly provided and being formed via another member besides being directly provided, and "formed" has a meaning including being integrally formed. The term "supported" has a meaning including being supported indirectly via another member besides being supported directly. The term "connected" has a meaning including being indirectly connected via another member besides being directly connected.

According to the present disclosure, there can be suppressed generation of the vibration contact between the valve and the valve seat by pulsation or the like of the exhaust gas from the engine side in the vicinity of the stem during the operation of the turbocharger, and thus the chattering sound from the variable flow valve can be reduced, and quietness of the variable flow valve, in other words, quietness of the turbocharger can be enhanced.

BRIEF DESCRIPTION OF THE DRAWINGS

FIG. 1A and FIG. 1B are enlarged cross-sectional diagrams along an I-I line in FIG. 2, in which FIG. 1A is a diagram illustrating a state where an opening portion on an outlet side of a bypass passage is closed, and FIG. 1B is a diagram illustrating a state when the opening portion on the outlet side of the bypass passage begins to be opened or immediately before the opening portion is closed.

FIG. 6A and FIG. 6B are cross-sectional diagrams illustrating a variation of the embodiment of the present disclosure, in which FIG. 6A is a diagram illustrating a state where the opening portion on the outlet side of the bypass passage is closed, and FIG. 6B is a diagram illustrating a state when the opening portion on the outlet side of the bypass passage begins to be opened or immediately before the opening portion is closed.

DESCRIPTION OF THE EMBODIMENTS

An embodiment of the present disclosure will be described by referring to the attached drawings. Note that reference character "L" in the figure denotes a left direction and "R" denotes a right direction.

Figure 5:
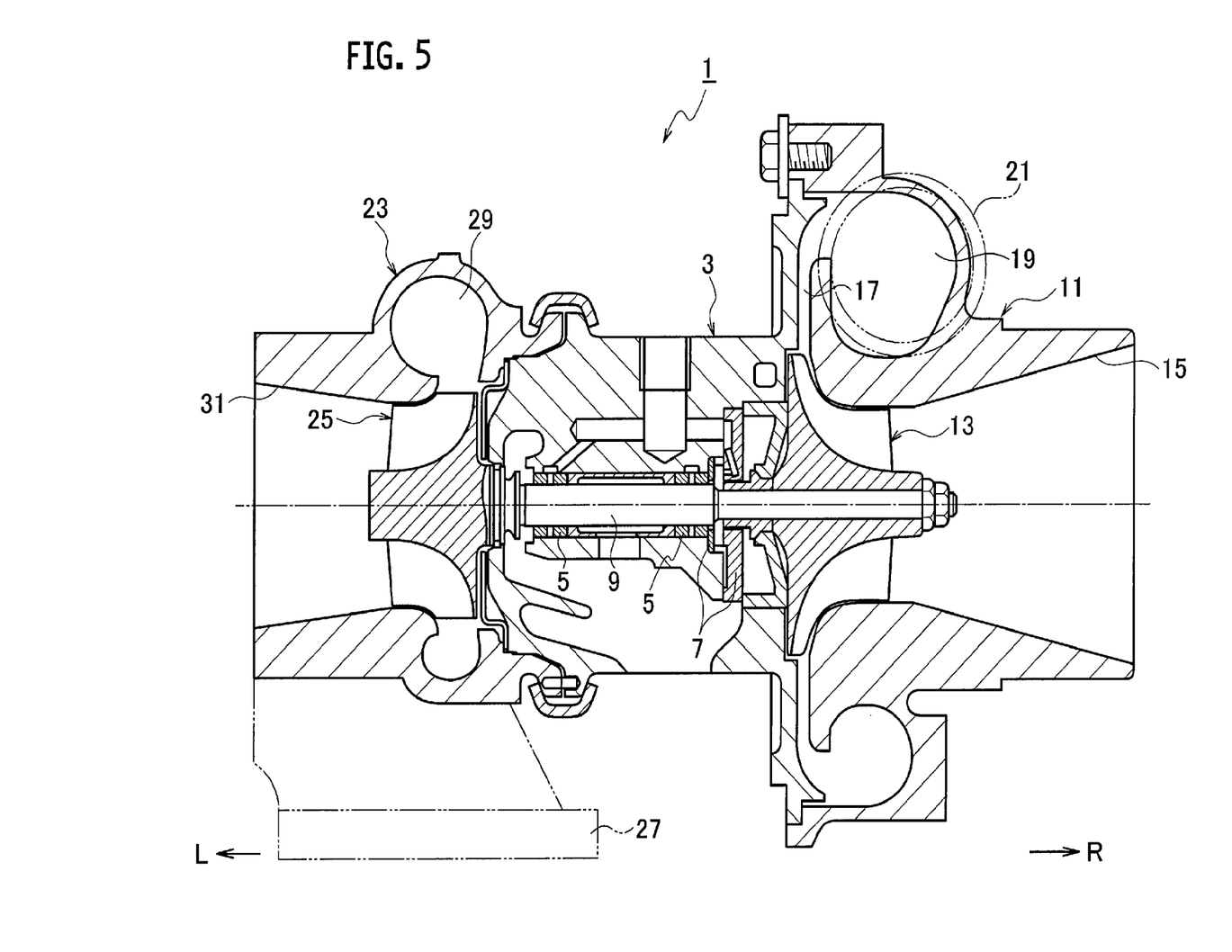
FIG. 5 is a front cross-sectional diagram of a turbocharger according to the embodiment of the present disclosure.

A turbocharger 1 according to the embodiment of the present disclosure is for a vehicle, for example. As illustrated in FIG. 5, the turbocharger 1 turbocharges (compresses) air to be supplied to an engine by utilizing energy of an exhaust gas from an engine (not shown).

As illustrated in FIG. 5, the turbocharger 1 includes a bearing housing 3. A pair of radial bearings 5 and 5 and a pair of thrust bearings 7 and 7 are provided in the bearing housing 3. These bearings rotatably support a rotor shaft (turbine shaft) 9 extending in a right-and-left direction. In other words, the rotor shaft 9 is rotatably provided via the plurality of bearings 5 and 7 in the bearing housing 3.

A compressor housing 11 is provided on the right side of the bearing housing 3. In addition, a compressor wheel 13 is rotatably provided in the compressor housing 11. The compressor wheel 13 is integrally connected concentrically on a right end portion of the rotor shaft 9 and compresses air by utilizing a centrifugal force.

An air inlet (air inlet passage) 15 for introducing air is formed on an inlet side (upstream side in a main stream direction of air) of the compressor wheel 13 in the compressor housing 11. The air inlet 15 is connected to an air cleaner (not shown) for purifying air. Furthermore, a diffuser channel 17 is formed on an outlet side (downstream side in the main stream direction of the air) of the compressor wheel 13 between the bearing housing 3 and the compressor housing 11. The diffuser channel 17 is annularly formed and boosts the pressure of the compressed air. Moreover, a compressor scroll channel 19 is provided in the compressor housing 11. The compressor scroll channel 19 is formed in a spiral state so as to surround the compressor wheel 13 and communicates with the diffuser channel 17. An air outlet (air outlet passage) 21 is formed for discharging the compressed air, at an appropriate position on the outer wall of the compressor housing 11. The air outlet 21 communicates with the compressor scroll channel 19 and is connected to an air feed manifold (not shown) of the engine.

A turbine housing 23 is provided on the left side of the bearing housing 3. In addition, a turbine wheel 25 is rotatably provided in the turbine housing 23. The turbine wheel 25 is integrally connected concentrically on a left end portion of the rotor shaft 9 and generates a rotary force (rotary torque) by using pressure energy of the exhaust gas.

Figure 3:
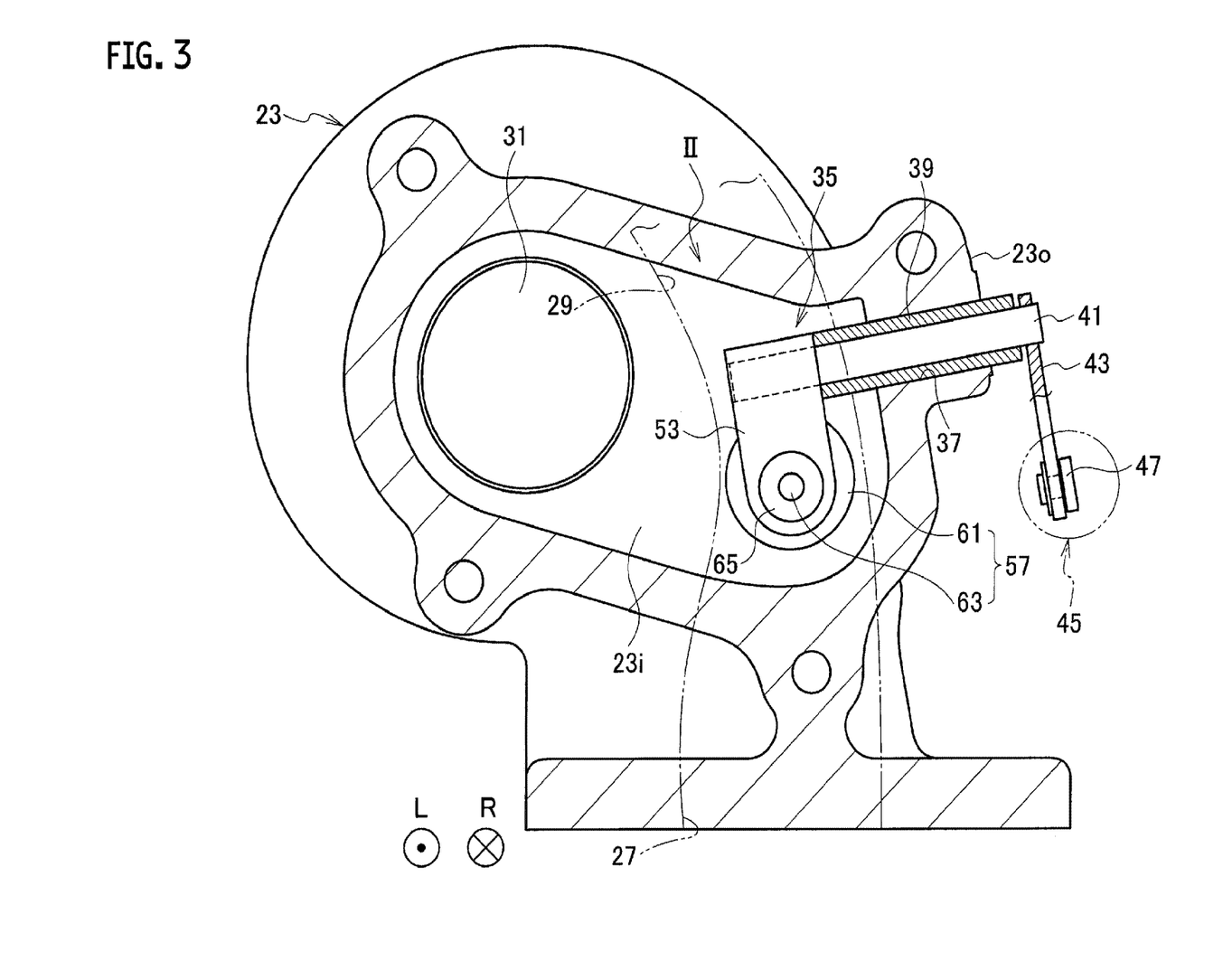
FIG. 3 is a cross-sectional diagram along a line in FIG. 4.
Figure 4:
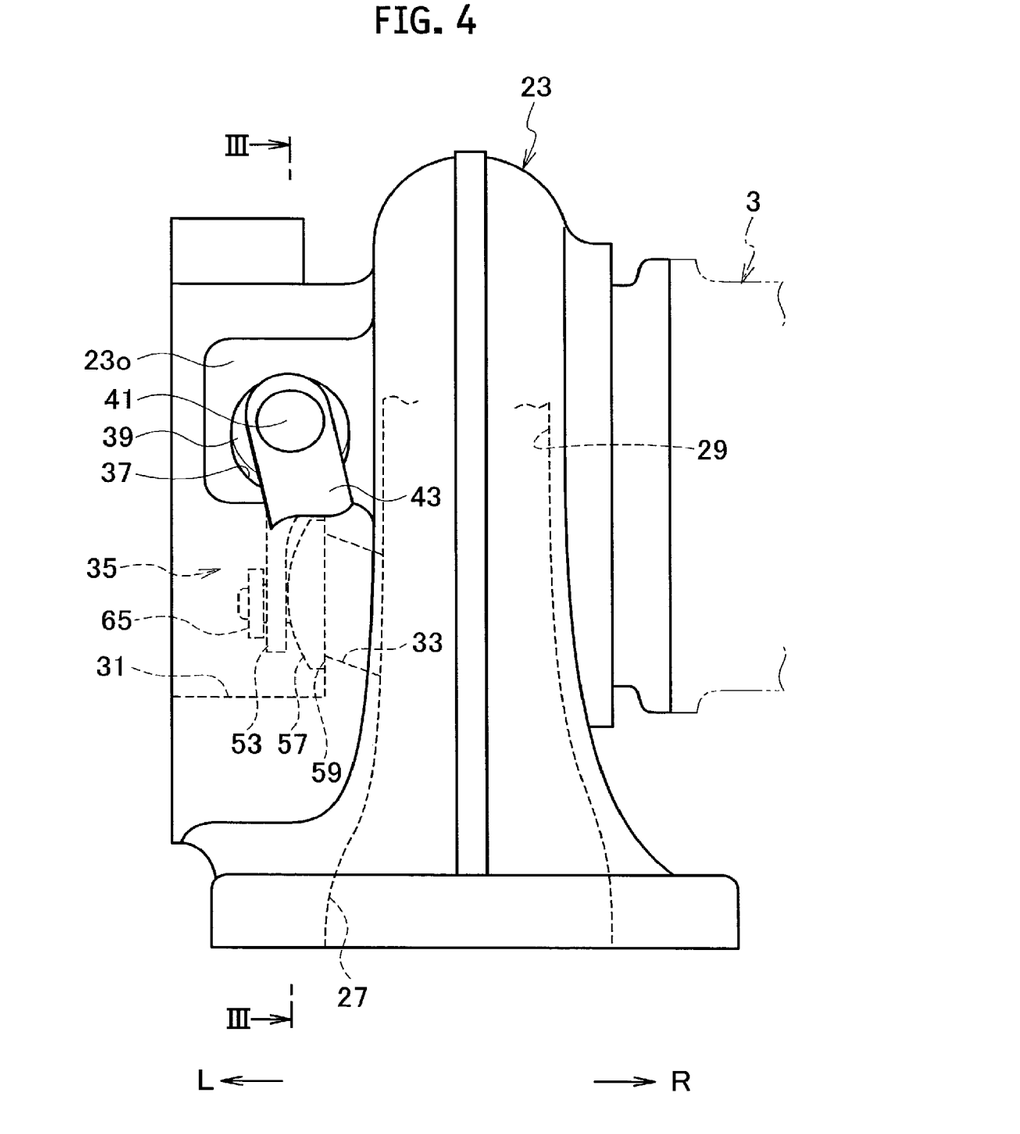
FIG. 4 is a partial front diagram of a turbocharger according to an embodiment of the present disclosure.

As illustrated in FIGS. 3 to 5, a gas inlet (gas inlet passage) 27 for introducing the exhaust gas is formed at an appropriate position in the turbine housing 23. The gas inlet 27 is connected to an exhaust manifold (not shown) of the engine. Furthermore, a turbine scroll channel 29 in a spiral state is formed on an inlet side (upstream side in the mainstream direction of the exhaust gas) of the turbine wheel 25 in the turbine housing 23. In addition, a gas outlet (gas outlet passage) 31 for discharging the exhaust gas is formed on an outlet side (downstream side in the main stream direction of the exhaust gas) of the turbine wheel 25 in the turbine housing 23. The gas outlet 31 is connected to a purifying device (not shown) of the exhaust gas using a catalyst via a connection pipe (not shown) or the like.

Figure 1A:
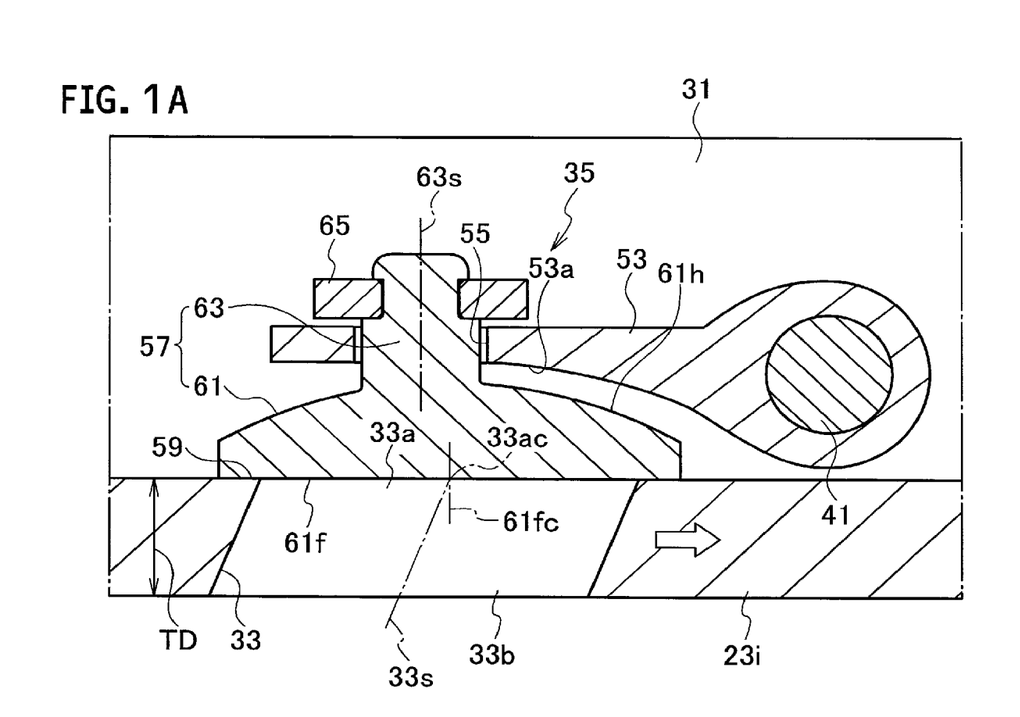
Figure 1B:
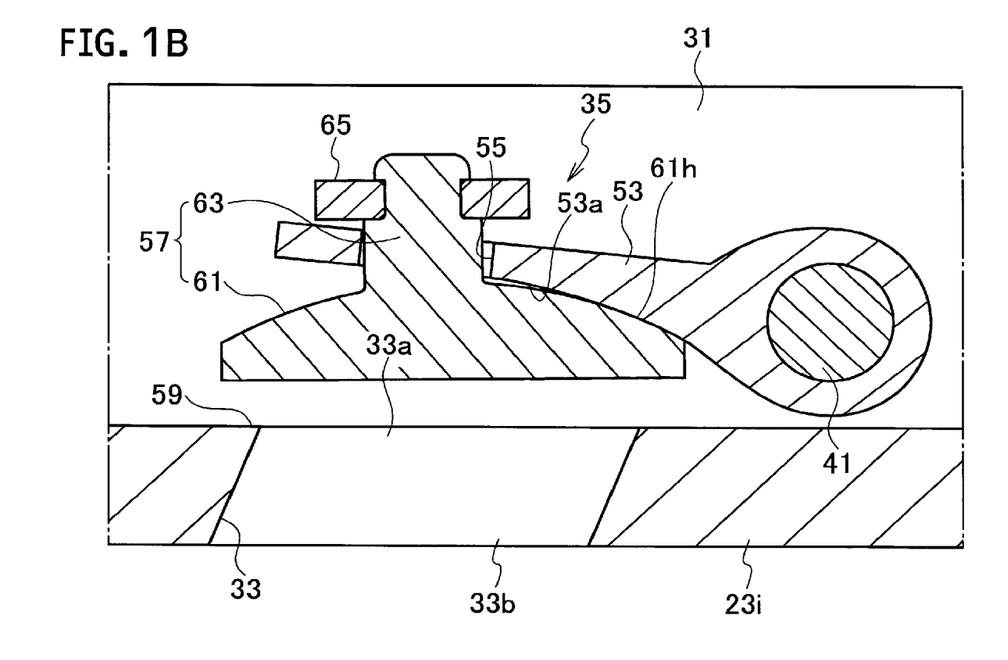
Figure 2:
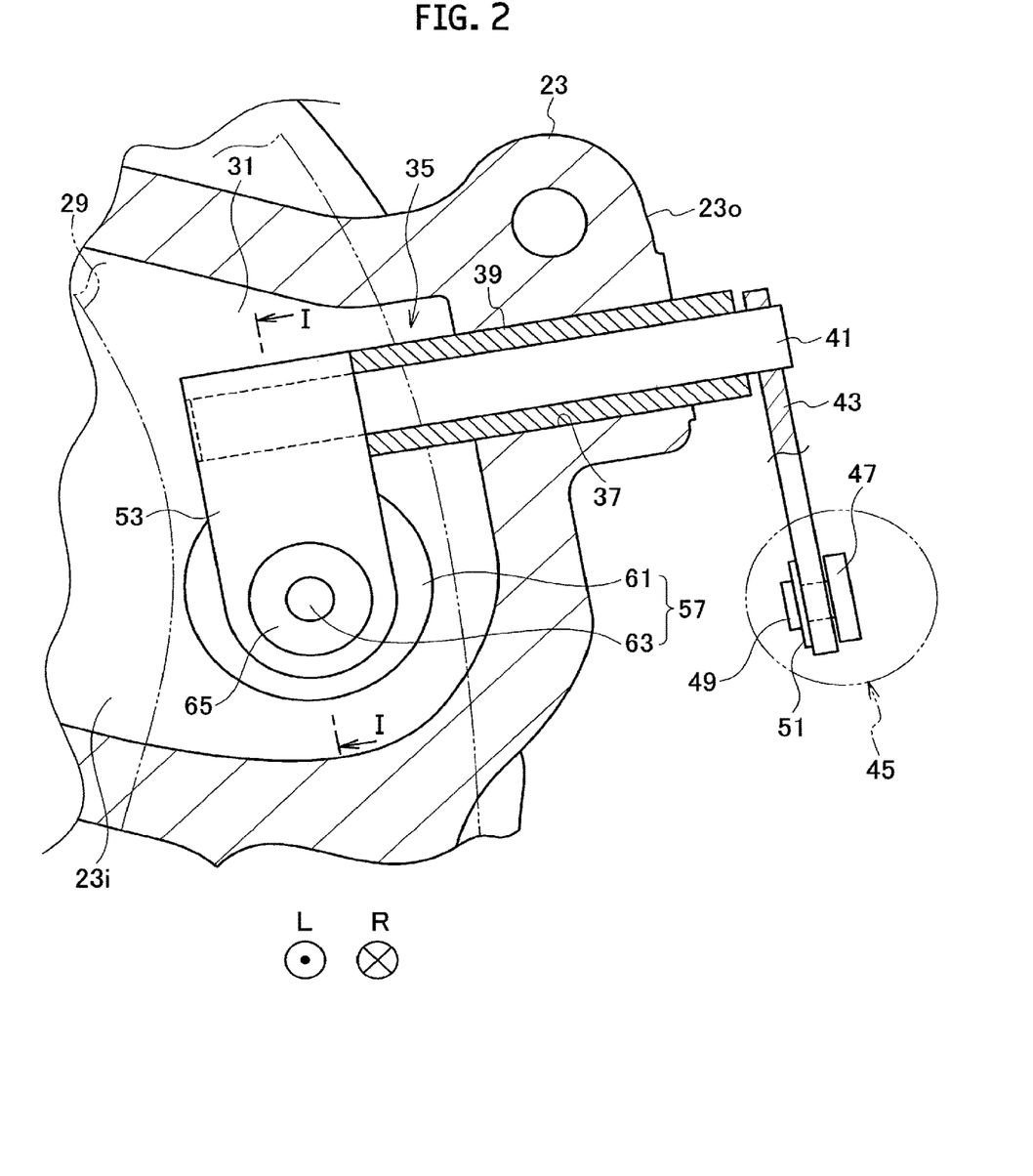
FIG. 2 is an enlarged diagram of an arrow view portion II in FIG. 3.

As illustrated in FIGS. 1 to 3, a bypass passage 33 is formed in an inner wall portion 23i on the gas outlet 31 side in the turbine housing 23. A part of the exhaust gas introduced through the gas inlet 27 flows through the bypass passage 33 and is led out to the gas outlet 31 side. That is, the part of the exhaust gas bypasses the turbine wheel 25 by the bypass passage 33. In other words, the bypass passage 33 is a so-called variable gas flow passage for adjusting a flow rate of the exhaust gas to be supplied to the turbine wheel 25 side.

A waste gate valve 35 is provided at an appropriate position of the turbine housing 23. The waste gate valve 35 is constituted so as to open and close an opening portion of the bypass passage 33. That is, the waste gate valve 35 is a so-called variable flow valve (a variable flow valve mechanism).

The waste gate valve 35 includes a stem (rotating shaft) 41 rotatably supported by the turbine housing 23, a valve 57 that opens and closes the opening portion (valve seat 59) of the bypass passage 33, and a mounting member 43 for connecting the stem 41 with the valve 57. The stem 41 is rotatably formed in a support hole 37 penetrated and formed in an outer wall portion 23o of the turbine housing 23, in a forward direction and a reverse direction via a bush 39. A base end portion (one end portion, first end portion) of the stem 41 protrudes outward from the outer wall portion 23o of the turbine housing 23. The bush 39 is provided in the support hole 37 by press-fitting.

A base end portion (one end portion) of a link member (link plate) 43 is integrally connected to the base end portion of the stem 41. The link member 43 swings in a forward direction and in a reverse direction around an axial center of the stem 41 by driving an actuator 45. Furthermore, the actuator 45 includes an operating rod 47 capable of reciprocating movement in a right-and-left direction. A distal end portion of the operating rod 47 is rotatably connected to a distal end portion (the other end portion) of the link member 43 via a connecting pin 49 and a retaining ring 51 or the like. The actuator 45 is a diaphragm actuator as illustrated in, for example, Japanese Patent Application Laid-Open Publication Nos. 10-103069, 2008-25442 and the like. Note that the base end portion of the link member 43 is connected integrally to the base end portion of the stem 41 by, for example, fillet welding, TIG welding, laser beam welding, swaging or the like. Instead of the diaphragm actuator, an electric actuator by electronic control or a hydraulic actuator by hydraulic driving may be used as the actuator 45.

A base end portion of the mounting member (mounting plate) 53 is integrally connected to the distal end portion (the other end portion) of the stem 41. The mounting member 53 is located in the turbine housing 23. In addition, a mounting hole 55 having a shape with width across flats or having a circular shape is penetrated and formed at a distal end portion of the mounting member 53. Note that a base end portion of the mounting member 53 is integrally connected to the distal end portion of the stem 41 by, for example, fillet welding, TIG welding, laser beam welding, swaging, or the like.

The valve 57 is fitted into the mounting hole 55 of the mounting member 53. In this fitting, the valve 57 is allowed to have play (including tilting and slight movement) with respect to the mounting member 53. In addition, the valve 57 includes a valve body 61. The valve body 61 has a circular valve surface 61f capable of being brought into contact with and being separated from the valve seat 59 on a peripheral edge of the opening portion 33a on the outlet side of the bypass passage 33. A head (portion on a side opposite to the valve surface 61f) 61h of the valve body 61 has a conical shape. Furthermore, a valve shaft 63 having a circular cross-section as a valve connecting member (valve connecting portion) is integrally formed on the head 61h of the valve body 61. The valve shaft 63 is connected to the mounting hole 55 of the mounting member 53 by fitting. Here, the play (rattling) of the valve 57 with respect to the mounting member 53 is allowed, and thus follow-up property (adhesiveness) of the valve body 61 to the valve surface 61f is enhanced, whereby stability (reliability) of the operation of the waste gate valve 35 is ensured. Furthermore, an annular retaining member (retainer) 65 as an example is integrally provided at a distal end portion of the valve shaft 63, in order to prevent removal of the valve 57 with respect to the mounting member 53. Note that a shape of the retaining member 65 is not limited to an annular shape. The retaining member 65 is integrally connected to the distal end portion of the valve shaft 63 by, for example, fillet welding, TIG welding, laser beam welding or swaging. The valve shaft 63 may be integrally provided on the head 61h of the valve body 61 and the retaining member 65 may be integrally formed on the distal end portion of the valve shaft 63, instead of integral formation of the valve shaft 63 on the head 61h of the valve body 61 and integral provision of the retaining member 65 on the distal end portion of the valve shaft 63 by fillet welding or the like. A cross-section of the valve shaft 65 is not limited to a circular shape but may be changed to an arbitrary shape such as a square. The cross-section of the valve shaft 65 is not limited to a circular shape but may be changed to an arbitrary shape such as a square. Instead of integral formation of the valve shaft 63 as a valve connecting member on the head 61h of the valve body 61, another valve connecting member (not shown) may be provided on the valve body 61 by penetrating the valve body 61 and the another valve connecting member may be connected to the mounting member 53. As an example, the valve shaft 63 is connected to the mounting hole 55 of the mounting member 53 by fitting, but a connection form (structure, means) between the valve shaft 63 and the mounting hole 55 of the mounting member 53 can be appropriately changed within a range which can allow a play of the valve 57 with respect to the mounting member 53.

As illustrated in FIGS. 1A and 1D, an axial center 33s of the bypass passage 33 is inclined with respect to a thickness direction TD of the inner wall portion 23i of the turbine housing 23 so that the opening portion 33a on the outlet side in the bypass passage 33 is located closer to the stem 41 side (side indicated by a void arrow in FIGS. 1A and 1B) than the opening portion 33b on the inlet side. Moreover, a center (center line) 61fc of the valve surface 61f of the valve body 61 when the valve surface 61f of the valve body 61 is brought into contact with the valve seat 59 coincides with a center (center line) 33ac of the opening portion 33a on the outlet side in the bypass passage 33. Furthermore, the center 61fc of the valve surface 61f of the valve body 61 is eccentric to the stem 41 side with respect to the axial center 63s of the valve shaft 63. In other words, the axial center 63s of the valve shaft 63 is eccentric to the side opposite to the stem 41 side with respect to the center 61fc of the valve surface 61f of the valve body 61. Moreover, a portion (portion on a side closer to the stem 41 than the mounting hole 55) 53a on a surface (back surface) facing the valve body 61 in the mounting member 53 and on the stem 41 side has a shape (an example of a corresponding shape) following the head 61h of the valve body 61.

Note that the axial center 33s of the bypass passage 33 may be parallel to the thickness direction TD of the inner wall portion 23i and the center 61fc of the valve surface 61f may coincide with the center 33ac of the opening portion 33a in the bypass passage 33. Alternatively, the axial center 33s of the bypass passage 33 may be inclined with respect to the thickness direction TD of the inner wall portion 23i and the center 61fc of the valve surface 61f may be located on the axial center 63s of the valve shaft 63. Shapes of the opening portions 33*a* and 33*b* of the bypass passage 33 are not limited to circular shapes but may be changed to arbitrary shapes such as a square, a triangle, an oval, and a semicircle. In this case, the valve surface 61*f* of the valve body 61 is also changed in accordance with the shapes of the opening portions 33*a* and 33*b* of the bypass passage 33.

Subsequently, an action and an effect of the embodiment of the present disclosure will be described.

A flow of the exhaust gas introduced from the gas inlet 27 through the turbine scroll channel 29 from the inlet side of the turbine wheel 25 to the outlet side makes it possible to generate a rotating force (rotary torque) by utilizing the pressure energy of the exhaust gas and to rotate the rotor shaft 9 and the compressor wheel 13 integrally with the turbine wheel 25. Accordingly, it is possible to compress the air introduced from the air inlet 15 and to discharge the compressed air from the air discharge port 21 through the diffuser channel 17 and the compressor scroll channel 19, whereby it is possible to turbocharge the air to be supplied to the engine.

When the turbocharging pressure (a pressure on the outlet side of the compressor wheel 13) reaches a set pressure during the operation of the turbocharger 1, the valve 57 is swung in the forward direction (opening direction) by swinging the link member 43 in the forward direction through the drive of the actuator 45 and by rotating the stem 41 in the forward direction, and the opening portion of the bypass passage 33 is opened. Accordingly, a part of the exhaust gas introduced from the gas inlet 27 is made to bypass the turbine wheel 25, and the flow rate of the exhaust gas to be supplied to the turbine wheel 25 side can be reduced.

Moreover, when the turbocharging pressure becomes less than the set pressure after the opening portion of the bypass passage 33 is opened, the valve 57 is swung in the reverse direction (closing direction) by swinging the link member 43 in the reverse direction through the drive of the actuator 45 and by rotating the stem 41 in the reverse direction, and the opening portion of the bypass passage 33 is closed. As a result, a flow of the exhaust gas in the bypass passage 33 is shut down, and the flow rate of the exhaust gas to be supplied to the turbine wheel 25 side can be increased.

Since, in the waste gate valve 35, the axial center 33*s* of the bypass passage 33 is constituted inclined to the thickness direction TD of the inner wall portion 23*i* of the turbine housing 23 as described above, the urging force can be applied to the valve 57 so that the portion (portion on the side closer to the stem 41 than the valve shaft 63) on the stem 41 side in the valve body 61 is brought into contact with or brought close to the mounting member 53 by the pressure of the exhaust gas from the bypass passage 33. Furthermore, since, in the waste gate valve 35, the center 61*fc* of the valve surface 61*f* of the valve body 61 is constituted so as to be eccentric to the stem 41 side with respect to the axial center 63*s* of the valve shaft 63, the urging force can be stably applied to the valve 57 by the pressure of the exhaust gas from the bypass passage 33. Accordingly, during the operation of the turbocharger 1, for example, when the opening portion 33*a* on the outlet side of the bypass passage 33 is to be opened or immediately before the opening portion 33*a* is to be closed (see FIG. 1B), contact caused by vibration between the valve 57 and the valve seat 59 by pulsation of the exhaust gas from the engine side, pulsation from the actuator side or the like can be suppressed, in the vicinity of the stem 41 (stem 41 side).

The portion 53*a* on the stem 41 side, which is a surface facing the valve body 61 in the mounting member 53 has a shape following the head 61*h* of the valve body 61, and thus, even in a case where, for example, the valve body 61 is brought into contact with the mounting member 53 by the pressure of the exhaust gas from the bypass passage 33, a contact pressure (impact force) between the valve body 61 and the mounting member 53 can be reduced.

Therefore, according to the embodiment of the present disclosure, after the contact pressure between the valve body 61 and the mounting member 53 is reduced, the contact caused by vibration between the valve 57 and the valve seat 59 by pulsation of the exhaust gas from the engine side or the like can be suppressed in the vicinity of the stem 41 during the operation of the turbocharger 1, and thus the chattering sound (contact sound caused by vibration) form the waste gate valve 35 can be reduced, and quietness of the waste gate valve 35, in other words, quietness of the turbocharger 1 can be enhanced. Furthermore, even in a case where, for example, the valve body 61 is brought into contact with the mounting member 53 by the pressure of the exhaust gas from the bypass passage 33, the contact pressure between the valve body 61 and the mounting member 53 can be reduced, and thus abrasion of the contact portion between the valve body 61 and the mounting member 53 can be suppressed.

Figure 6A:
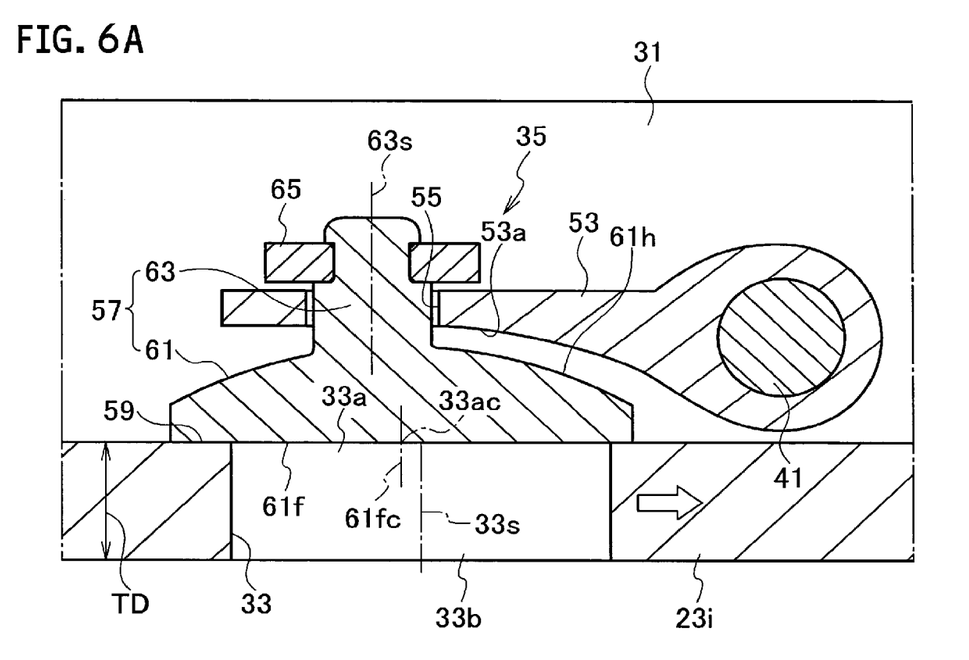
Figure 6B:
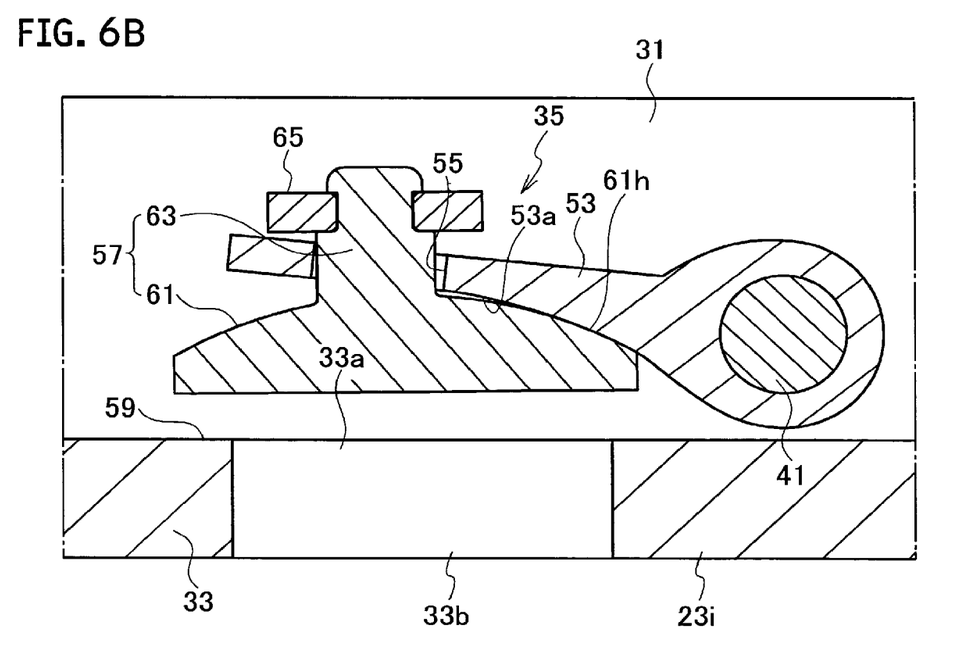

A modification of this embodiment will be described. As illustrated in FIGS. 6A and 6B, the axial center 33*s* of the bypass passage 33 is parallel to the thickness direction TD of the inner wall portion 23*i* of the turbine housing 23. In addition, the center 61*fc* of the valve surface 61*f* of the valve body 61 when the valve surface 61*f* of the valve body 61 is brought into contact with the valve seat 59 is eccentric to the side opposite to the stem 41 side (side of a void arrow in FIGS. 6A and 6B) with respect to the axial center 33*s* of the bypass passage 33. In other words, the axial center 33*s* of the bypass passage 33 is eccentric to the stem 41 side with respect to the center 61*fc* of the valve surface 61*f* of the valve body 61 when the valve surface 61*f* of the valve body 61 is brought into contact with the valve seat 59. Note that the center 61*fc* of the valve surface 61*f* may be located on the axial center 63*s* of the valve shaft 63.

According to the modification of the embodiment of the present disclosure, since the center 61*fc* of the valve surface 61*f* of the valve body 61 at the time of being brought into contact with the valve seat 59 is eccentric to the side opposite to the stem 41 side with respect to the axial center 33*s* of the bypass passage 33, the urging force can be applied to the valve 57 so that the portion on the stem 41 side in the valve body 61 can be brought into contact with or brought close to the mounting member 53 by the pressure of the exhaust gas from the bypass passage 33.

Therefore, according to the modification of the embodiment of the present disclosure, the effect similar to that of the embodiment of the present disclosure is exerted.

The present disclosure is not limited to the explanation of the aforementioned embodiment but can be carried out in various modes as follows.

That is, as an example, instead of provision of the waste gate valve 35 that opens and closes the opening portion 33*a* on the outlet side of the bypass passage 33 at an appropriate position of the turbine housing 23, there may be provided a waste gate valve (not shown) that opens and closes the opening portion on the outlet side of the bypass passage (not shown) formed in the exhaust manifold at an appropriate position of the exhaust manifold (not shown) connected in a state of communicating with the gas inlet 27 of the turbine housing 23. In addition, the waste gate valve 35 may open and close the opening portions on the outlet sides of a plurality of bypass passages (not shown) instead of opening and closing of the opening portion 33a on the outlet side of the one bypass passage 33. In this case, the axial center of at least one bypass passage is inclined with respect to the thickness direction TD of the inner wall portion 23i of the turbine housing 23 as described above. Alternatively, the center 61fc of the valve surface 61f of the valve body 61 becomes eccentric to the side opposite to the stem 41 side with respect to the axial center of at least one bypass passage as described above.

In addition, the scope of the right included in the present disclosure is not limited to the aforementioned embodiment.

That is, the variable flow valve of the present application is not limited to the aforementioned waste gate valve 35 but can also be applied to a switching valve mechanism (not shown) that switches between a supply state and a supply stop state of the exhaust gas with respect to any of a plurality of turbine scroll channels (not shown) formed in the turbine housing (not shown) as illustrated in, for example, Japanese Utility Model Application Laid-Open No. 61-33923 and Japanese Patent Application Laid-Open Publication No. 2001-263078. Furthermore, the variable flow valve of the present application can also be applied to a switching valve mechanism (not shown) that switches between the supply state and the supply stop state of the exhaust gas with respect to any stage of a multiple-stage turbine housings (not shown) as illustrated in, for example, Japanese Patent Application Laid-Open Publication Nos. 2010-209688 and 2011-106358.

What is claimed is:

1. A turbocharger comprising:
   a turbine housing configured to house a turbine wheel, the turbine housing including a first passage of an exhaust gas to be supplied from an engine, the first passage having an inner wall and extending from an inlet thereof provided on an outer surface of the turbine housing to an outlet thereof provided on the outer surface of the turbine housing via the turbine wheel;
   a second passage configured to adjust a flow rate of the exhaust gas to be supplied to the turbine wheel, the second passage including an outlet opening portion formed between the turbine wheel and the outlet of the first passage on the inner wall of the first passage of the turbine housing; and
   a variable flow valve configured to open and close the outlet opening portion, wherein
   the variable flow valve includes:
     a stem rotatably supported by the turbine housing;
     a mounting member integrally connected to the stem; and
     a valve body and a valve connecting member provided on the valve body, the valve body having a valve surface configured to open and close the outlet opening portion of the second passage, and the valve connecting member connecting the valve body with the mounting member, and
   a center of the valve surface of the valve body is eccentric to a first side opposite to a second side on which the stem is located with respect to an axial center of the second passage, when the valve body is positioned to close the outlet opening portion of the second passage.

2. The turbocharger according to claim 1, wherein
   the axial center of the second passage extends from an inside of the second passage to the outlet opening portion thereof with inclination toward the stem with respect to a thickness direction of the inner wall of the turbine housing.

3. The turbocharger according to claim 2, wherein
   the center of the valve surface of the valve body is eccentric to the second side with respect to the axial center of the valve connecting member.

4. The turbocharger according to claim 3, wherein
   the second passage is a bypass passage for exhaust gas to bypass the turbine wheel.

5. The turbocharger according to claim 2, wherein
   the mounting member includes a surface located on the second side, which faces the valve body and has a shape corresponding to a head of the valve body.

6. The turbocharger according to claim 5, wherein
   the second passage is a bypass passage for exhaust gas to bypass the turbine wheel.

7. The turbocharger according to claim 2, wherein
   the second passage is a bypass passage for exhaust gas to bypass the turbine wheel.

8. The turbocharger according to claim 1, wherein
   the center of the valve surface of the valve body is eccentric to the second side with respect to the axial center of the valve connecting member.

9. The turbocharger according to claim 8, wherein
   the second passage is a bypass passage for exhaust gas to bypass the turbine wheel.

10. The turbocharger according to claim 1, wherein
    the mounting member includes a surface located on the second side, which faces the valve body and has a shape corresponding to a head of the valve body.

11. The turbocharger according to claim 10, wherein
    the second passage is a bypass passage for exhaust gas to bypass the turbine wheel.

12. The turbocharger according to claim 1, wherein
    the second passage is a bypass passage for exhaust gas to bypass the turbine wheel.

13. The turbocharger according to claim 1, wherein a retainer is provided at a distal end of the valve connecting member, the retainer preventing removal of the valve body and the valve connecting member with respect to the mounting member.

* * * * *